A. C. CREMER & G. F. MOLANDER.
BATTERY BOX SUPPORT AND INSULATOR.
APPLICATION FILED JULY 29, 1913.
1,097,392.
Patented May 19, 1914.
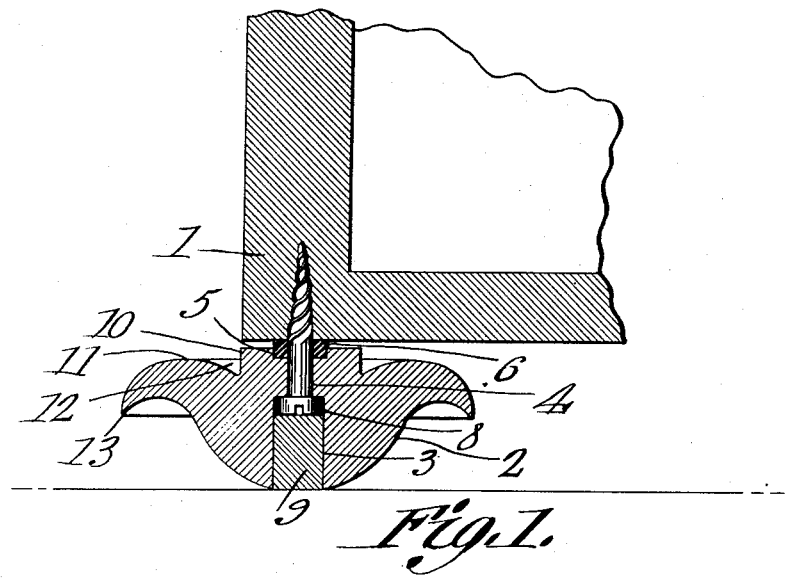
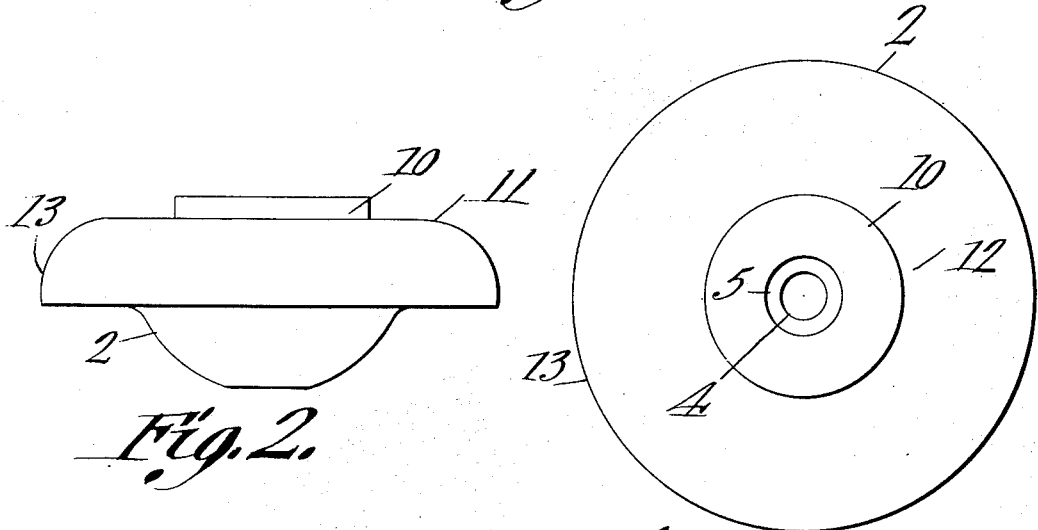

UNITED STATES PATENT OFFICE.

AUGUST C. CREMER AND GUSTAF F. MOLANDER, OF BALTIMORE, MARYLAND.

BATTERY-BOX SUPPORT AND INSULATOR.

1,097,392.

Specification of Letters Patent.

Patented May 19, 1914.

Application filed July 29, 1913. Serial No. 781,846.

*To all whom it may concern:*

Be it known that we, AUGUST C. CREMER and GUSTAF F. MOLANDER, a citizen of the United States and a subject of the King of Sweden, respectively, residing at Baltimore, in the State of Maryland, have invented a new and useful Battery-Box Support and Insulator, of which the following is a specification.

The present invention relates to improvements in battery box supports and insulators, more particularly for use in connection with railroad storage batteries for lighting systems, one object of the invention being the provision of a support and insulator, so constructed and attached, as to prevent any short circuiting due to the slopping or foaming over of the acid within the battery and thus removing a great objection to the present forms of supports and insulators for battery boxes.

A further object is to provide a reservoir to receive the normal overflow of acid, so that the same is retained during the evaporation and is not permitted to drip upon the floor.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a sectional view through one corner of a battery box with the present insulator and support in section connected thereto. Fig. 2 is a side elevation of the insulator and support *per se*. Fig. 3 is a top plan view thereof.

Referring to the drawings, the numeral 1 designates the battery box, and 2 the insulator and support. This insulator and support is provided with the enlarged bore 3 at the lower end centrally thereof, the reduced screw receiving bore 4, and the gasket receiving bore 5. A gasket 6 preferably of rubber or other insulating material is positioned within the socket 5 about the screw 8, so that a connection is made at such point to prevent any acid from affecting the screw. The cavity formed in the bore 3 below the head of the screw is filled with an insulating material of a plastic cementitious character, and thus protects the head of the screw from corrosion.

The upper surface of the insulator 2 is provided with the central cylindrical boss 10, which with the curved surface 11 of the apron 13 of the insulator provides the evaporating receptacle 12 upon the upper surface of the insulator and support, so that any overflow of the acid due to the shaking and jarring of the battery box, as is often the case with battery boxes used in railroad cars, will retain the small overflow amount of the acid to hold the same during the evaporation thereof, the usual small overflow thus being held from dripping upon the floor.

The rim of the apron 13, as clearly illustrated in Fig. 1, is so constructed that any acid that may overflow the curved surface 11 and the lip 13 will be prevented from working upwardly and under the insulator or support, and consequently will drip therefrom upon the floor after running over at such point.

From the foregoing description, taken in connection with the drawings it is evident that an insulator and support of the present character is readily applied to any form of battery box, it being especially designed to be used in connection with railway battery boxes, and that after properly positioned, the screw 8 is properly protected from the corrosive effect of the acid due to the connection of the gasket 5 thereto, while the receptacle 12 of the insulator or support provides a means for receiving and retaining a certain portion of the acid that may overflow therein, such receptacle retaining the same during evaporation. In many cases the overflow is so small that the reservoir 12 will take care of the same and thus the battery support and insulator will not be detrimentally affected due to the acid.

What is claimed is:

1. A battery box support and insulator, composed of a body provided with a liquid retaining recess upon the upper surface thereof and an outwardly and downwardly inclined drip apron.

2. A battery box support and insulator, composed of a disk shaped body provided with a concentric liquid retaining recess upon the upper surface thereof and an outwardly and downwardly inclined drip apron, said disk being further provided with a central bore therethrough having a plurality of different diameters, a screw insertible from below through the body of the disk, and a protecting insulator gasket surrounding the screw and seated within one of the enlarged diametered portions of the bore.

3. A battery box support and insulator including a substantially mushroom-shaped member having a central screw receiving bore therethrough, the upper surface of the member being provided with a concentric groove to form an evaporating reservoir.

4. A battery box support and insulator including a substantially mushroom shaped member having a central screw receiving bore therethrough, the upper surface of the member being provided with a concentric groove to form an evaporating reservoir, the inner wall of said groove being a straight wall while the outer wall is curved to converge into the curvature of the upper surface of the disk.

In testimony that we claim the foregoing as our own, we have hereto affixed our signatures in the presence of two witnesses.

AUGUST C. CREMER.
GUSTAF F. MOLANDER.

Witnesses:
LOUISE M. CREMER,
LILLIAN M. CREMER.